US012789199B2

(12) United States Patent
Chou et al.

(10) Patent No.: US 12,789,199 B2
(45) Date of Patent: Nov. 10, 2026

(54) MAGNETIC SUBSTANCE SEPARATION DEVICE

(71) Applicant: INDUSTRIAL TECHNOLOGY RESEARCH INSTITUTE, Hsinchu (TW)

(72) Inventors: Nien-Jen Chou, Hsinchu City (TW); Nien-Tzu Chou, Hsinchu City (TW); Li-An Wu, New Taipei City (TW); Su feng Chiou, Miaoli County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 19/002,883

(22) Filed: Dec. 27, 2024

(65) Prior Publication Data

US 2025/0319476 A1 Oct. 16, 2025

Related U.S. Application Data

(60) Provisional application No. 63/615,650, filed on Dec. 28, 2023.

(51) Int. Cl.
*B03C 1/08* (2006.01)
*B01L 3/00* (2006.01)
*B03C 1/32* (2006.01)

(52) U.S. Cl.
CPC ................ *B03C 1/08* (2013.01); *B01L 3/505* (2013.01); *B03C 1/32* (2013.01); *B01L 2300/0609* (2013.01)

(58) Field of Classification Search
CPC ......... B03C 1/08; B03C 1/0332; B03C 1/034; B01L 3/505

(Continued)

(56) References Cited

U.S. PATENT DOCUMENTS 4,279,744 A * 7/1981 Antonwitsch ............. B03C 1/28 209/214
5,631,618 A * 5/1997 Trumper ............. G03F 7/70758 104/286

(Continued)

FOREIGN PATENT DOCUMENTS

CN 101319976 A 12/2008
CN 103920585 A 7/2014

(Continued)

OTHER PUBLICATIONS

English Translation (Year: 2013).*

(Continued)

*Primary Examiner* — Terrell H Matthews
(74) *Attorney, Agent, or Firm* — Maschoff Brennan

(57) ABSTRACT

A magnetic substance separation device is configured for attracting magnetic substances in a sample within a sample container. The magnetic substance separation device includes a casing and at least one magnetic component assembly. The casing has at least one accommodation compartment. The at least one magnetic component assembly is disposed in the at least one accommodation compartment, and the at least one magnetic component assembly includes at least four cubic magnetic components. In addition, the at least four cubic magnetic components are linearly arranged with different magnetization directions, allowing magnetic field lines of the at least one magnetic component assembly to concentrate on one side, such that the at least one magnetic component assembly forms at least one strong magnetic surface on the casing. The at least one strong magnetic surface is configured to attract the magnetic substances in the sample within the sample container.

17 Claims, 10 Drawing Sheets

(58) Field of Classification Search
USPC ............................................ 209/215, 223.1
See application file for complete search history.

(56) References Cited

U.S. PATENT DOCUMENTS

| | | | | |
|---|---|---|---|---|
| 6,413,420 | B1 | 7/2002 | Foy et al. | |
| 8,088,285 | B2 | 1/2012 | Siddiqi | |
| 8,701,893 | B2 | 4/2014 | Tung et al. | |
| 9,199,247 | B2 * | 12/2015 | Ellis | B03C 1/288 |
| 11,260,400 | B2 | 3/2022 | Zhu et al. | |
| 2003/0127396 | A1 * | 7/2003 | Siddiqi | B03C 1/0335 210/695 |
| 2016/0368001 | A1 | 12/2016 | Park et al. | |
| 2019/0161748 | A1 * | 5/2019 | Jervis | G01N 33/53 |
| 2021/0129158 | A1 * | 5/2021 | Kanai | B01J 19/08 |

FOREIGN PATENT DOCUMENTS

| | | | | |
|---|---|---|---|---|
| CN | 204039380 | U | 12/2014 | |
| CN | 104826731 | A | 8/2015 | |
| CN | 107541462 | A | 1/2018 | |
| CN | 114902044 | A | 8/2022 | |
| CN | 115851878 | A | 3/2023 | |
| CN | 116042386 | A | 5/2023 | |
| CN | 116103116 | A | 5/2023 | |
| JP | 6011890 | B2 * | 10/2016 | B29B 17/02 |
| JP | 2018-518355 | A | 7/2018 | |
| JP | 2019-515795 | A | 6/2019 | |
| TW | 200904534 | A | 2/2009 | |
| TW | 201121655 | A | 7/2011 | |
| TW | 201518498 | A | 5/2015 | |
| TW | 202212560 | A | 4/2022 | |
| WO | 92/16844 | A1 | 10/1992 | |
| WO | 2006/109529 | A1 | 10/2006 | |

OTHER PUBLICATIONS

Bruce L. Levine et al., "Large-Scale Production of CD4+ T Cells from HIV-1-Infected Donors After CD3/CD28 Costimulation", Journal of Hematotherapy 7:437-448 (1998).
TW Office Action dated Jan. 21, 2026 in application No. 113151190.
US Office Action dated Oct. 22, 2025 in U.S. Appl. No. 19/002,867.
TW Office Action dated Aug. 15, 2025 as received in Application No. 113151190.
JP Office Action dated Apr. 14, 2026 in application No. 2024-231762.
TW Office Action dated Jan. 21, 2026 in application No. 113151189.

* cited by examiner

MAGNETIC SUBSTANCE SEPARATION DEVICE

CROSS-REFERENCE TO RELATED APPLICATIONS

This application claims priority to U.S. Provisional Application Ser. No. 63/615,650, filed on Dec. 28, 2023, the entirety of which is incorporated by reference herein.

TECHNICAL FIELD

This disclosure relates to a magnetic substance separation device.

BACKGROUND

Conventional magnetic substances separation experiments often face multiple challenges. First of all, the magnetic force of magnetic substances from different manufacturers varies significantly, as well as the characteristics of biological samples (such as encapsulation phenomena) can affect the magnetic interaction, resulting in reduced separation efficiency. Secondly, the diversity of experimental containers makes it difficult to optimize magnetic interactions. Additionally, the relationship between magnetic force and distance also affects the separation effect. Conventional magnetic separation devices often struggle to balance efficiency, convenience, automation, biosafety and biocompatibility, limiting the advancement of magnetic separation experiments.

Therefore, how to provide a magnetic separation device that meets the requirements for efficiency, convenience, automation, biosafety and biocompatibility, while allowing flexible selections of suitable container shapes, surface materials and surface treatment methods according to the characteristics of different samples, remains a pressing challenge in this field for researchers.

SUMMARY

The present disclosure provides a magnetic substance separation device that enhances the efficiency of magnetic interactions by optimizing the arrangement of magnets, utilizing a strong magnetic force design, and adapting to different container shapes, thereby offering a more comprehensive and reliable solution for magnetic substance separation experiments.

One embodiment of the disclosure provides a magnetic substance separation device configured for attracting magnetic substances in a sample within a sample container. The magnetic substance separation device includes a casing and at least one magnetic component assembly. The casing has at least one accommodation compartment. The at least one magnetic component assembly is disposed in the at least one accommodation compartment, and the at least one magnetic component assembly includes at least four cubic magnetic components. In addition, the at least four cubic magnetic components are linearly arranged with different magnetization directions, allowing magnetic field lines of the at least one magnetic component assembly to concentrate on one side, such that the at least one magnetic component assembly forms at least one strong magnetic surface on the casing. The at least one strong magnetic surface is configured to attract the magnetic substances in the sample within the sample container.

According to the magnetic substance separation device as disclosed in the embodiment of the disclosure, a strong magnetic surface can be formed on the casing by arranging the cubic magnetic components in a specific manner, thereby providing stronger magnetic force per unit area with fewer magnetic components. Furthermore, the magnetic substance separation device can be adjusted to adapt to different container shapes, thereby improving the efficiency of magnetic interactions while meeting the requirements for efficiency, convenience, automation, biosafety and biocompatibility simultaneously.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
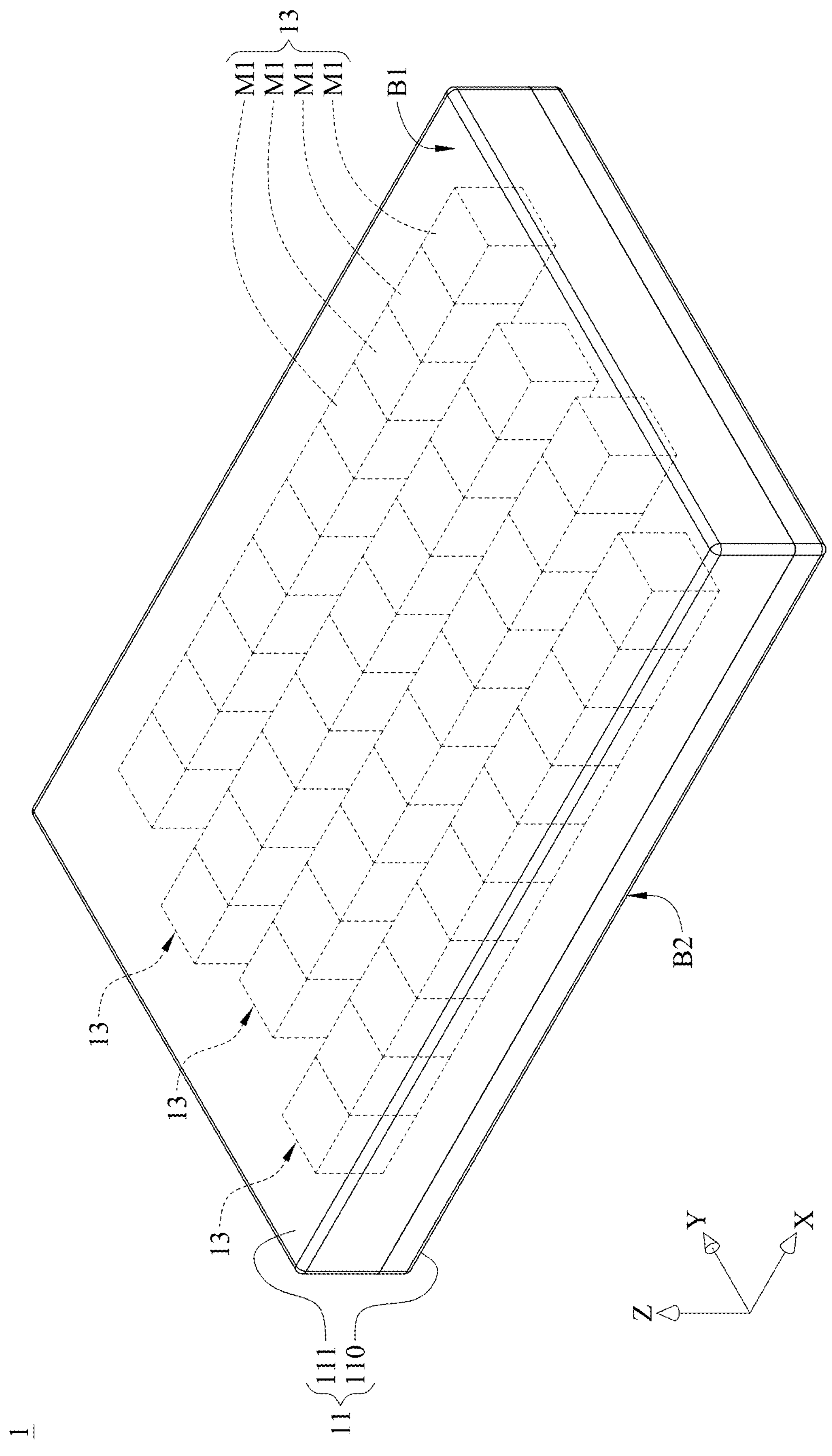
FIG. 1 is a perspective view of a magnetic substance separation device in accordance with the first embodiment of the disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It should be understood that the following description provides various embodiments or examples for implementing different aspects of the present disclosure. The specific components and arrangements described below are merely simplified explanations of the disclosure, provided for illustrative purposes and not as limitations. The term "about" as used in the present disclosure refers to a value that includes the stated value as well as values within an acceptable range of deviation, considering measurement issues and errors (i.e., the limitations of the measurement system) by those skilled in the art. For example, "about" can mean within one or more standard deviations of the stated value or within ±5% of the stated value. Quantities provided herein are approximate, meaning that even if terms such as "about," "approximately," or "substantially" are not explicitly stated, they may still be implied. Additionally, the expression "a to b" as used in the present disclosure indicates a range that includes values greater than or equal to "a" and less than or equal to "b".

It can be understood that although terms like "first", "second", "third" and so on may be used herein to describe various components, regions, layers, and/or portions, these components, regions, layers, and/or portions should not be limited by these terms. These terms are used solely to distinguish one component, region, layer, and/or portion from another. Thus, a "first" component, region, layer, and/or portion discussed below could be referred to as a "second" component, region, layer, and/or portion without departing from the teachings of the embodiments of the disclosure.

The present disclosure provides a magnetic substance separation device for attracting magnetic substances in a sample within a sample container, thereby achieving the purpose of separating the magnetic substances from the sample, but its application is not limited to separating magnetic substances from samples. In some aspects, the magnetic substance separation device may also be configured to separate substances attracted or linked to magnetic substances, and whether the separated substances are to be retained or discarded depends on the purpose of the experiment.

According to the present disclosure, the magnetic substance separation device includes a casing and at least one magnetic component assembly. The casing has at least one accommodation compartment. The at least one magnetic component assembly is disposed in the at least one accommodation compartment, and the at least one magnetic component assembly includes at least four cubic magnetic components. Furthermore, the at least four cubic magnetic components are linearly arranged with different magnetization directions, allowing magnetic field lines of the at least one magnetic component assembly to concentrate on one side, such that the magnetic component assembly forms at least one strong magnetic surface on the casing, and the at least one strong magnetic surface is configured to attract the magnetic substances in the sample within the sample container. The cubic magnetic components being linearly arranged with different magnetization directions may refer to that the magnetization direction of each cubic magnetic component rotates according to a specific pattern. For example, the magnetization direction of each sequentially arranged cubic magnetic component is rotated by 90 degrees relative to the magnetization direction of the preceding cubic magnetic component.

In one aspect, the at least four cubic magnetic components are, for example, arranged in Halbach array.

In one aspect, the magnetic component assembly may further form a weak magnetic surface on the casing, and the weak magnetic surface and the strong magnetic surface may be located on opposite sides of the casing. It should be noted that in configurations where the casing is, for example, plate-shaped, the strong magnetic surface is defined as being located on a reference plane formed by an X-axis a Y-axis. An extension direction of the accommodation compartment in the casing may, for example, be parallel to the X-axis or the Y-axis, allowing the magnetic component assembly to have a more flexible configuration based on the actual design requirements, but the present disclosure is not limited to the aforementioned extension directions of the accommodation compartment in the casing.

In one aspect, the at least one magnetic component assembly may include a plurality of magnetic component assemblies, the at least one accommodation compartment may include a plurality of accommodation compartments, and the magnetic component assemblies are respectively disposed in the accommodation compartments. In other words, the number of magnetic component assemblies may be multiple, and the number of accommodation compartments may also be multiple. In addition, the number of magnetic component assemblies may correspond to the number of accommodation compartments, allowing each magnetic component assembly to be disposed in a respective accommodation compartment. Moreover, the cubic magnetic components in one of the accommodation compartments may be arranged in alignment with the cubic magnetic components in another of the accommodation compartments, but the disclosure is not limited thereto. In other configurations, the cubic magnetic components in one of the accommodation compartments may be arranged in an offset configuration relative to the cubic magnetic components in another of the accommodation compartments.

In one aspect, each two adjacent cubic magnetic components within the same accommodation compartment may be in physical contact with each other, but the disclosure is not limited thereto. In other configurations, there may be a gap between each two adjacent cubic magnetic components within the same accommodation compartment, and the gap is, for example, greater than 0 mm and less than or equal to 2.0 mm.

In configurations where the number of accommodation compartments is multiple, the casing may have a plurality of partitions, and the partitions are respectively disposed between two adjacent accommodation compartments. In other words, the partitions of the casing can divide an internal space of the casing into multiple accommodation compartments, each designed to house a magnetic component assembly. Moreover, a thickness of each of the partitions may be a value ranging from 1.0 mm to 10.0 mm. Preferably, the thickness of each of the partitions may be a value ranging from 1.5 mm to 7.9 mm. For example, in one configuration, the thickness of each partition of the casing may be substantially 1.5 mm; in another configuration, the thickness of each partition of the casing may be substantially 1.8 mm; in still another configuration, the thickness of each partition of the casing may be substantially 4.8 mm; in yet another configuration, the thickness of each partition of the casing may be substantially 7.9 mm.

According to the magnetic substance separation device of the present disclosure, a thickness of the casing at the strong magnetic surface may be a value ranging from 1.0 mm to 2.0 mm. For example, in one configuration, the casing thickness of the casing at the strong magnetic surface may be substantially 1.0 mm; in another configuration, the casing thickness of the casing at the strong magnetic surface may be substantially 1.5 mm; in still another configuration, the casing thickness of the casing at the strong magnetic surface may be substantially 1.8 mm; in yet another configuration, the casing thickness of the casing at the strong magnetic surface may be substantially 2.0 mm.

In one configuration, the magnetic component assembly may be in physical contact with an inner peripheral surface of the accommodation compartment, but the disclosure is not limited thereto. In other configurations, there may be a gap between the magnetic component assembly and at least part of the inner peripheral surface of the accommodation compartment.

According to the magnetic substance separation device of the present disclosure, a side length of each cubic magnetic component may be a value ranging from 1 mm to 15 mm. Preferably, the side length of each cubic magnetic component may be a value ranging from 3 mm to 10 mm. For example, in one configuration, the side length of each cubic magnetic component of the magnetic component assembly may be substantially 3 mm; in another configuration, the side length of each cubic magnetic component of the magnetic component assembly may be substantially 5 mm; in still another configuration, the side length of each cubic magnetic component of the magnetic component assembly may be substantially 10 mm.

In one configuration, the magnetic substance separation device may further include a holder disposed on the casing, and the holder is configured to secure the sample container onto the strong magnetic surface of the casing.

In configurations where the magnetic substance separation device includes a holder, the holder may include a central post, and the sample container may be a flexible tube. The central post may be disposed in a central region of the strong magnetic surface, and the central post is configured for the sample container to be wound around. In some configurations, the holder may further include a cover disposed on the casing, forming an accommodation space between the cover and the strong magnetic surface. Moreover, the cover may have a first passage hole and a second passage hole that are connected to the accommodation space, the central post may be disposed to pass through the cover, and the central post may have a winding groove. The first passage hole of the cover is configured for the sample container to pass through and extend into the accommodation space, the winding groove of the central post is located in the accommodation space and configured for the sample container to be wound around, and the second passage hole of the cover is configured for the sample container to pass through and extend out of the accommodation space.

According to the magnetic substance separation device of the present disclosure, in configurations where the sample container is a flexible tube, the flexible tube may be connected to an automated processing device (such as a cell culture apparatus), allowing the magnetic substance separation device to continuously and automatically remove magnetic substances (e.g., magnetic beads) used during the culturing process. For example, the automated processing device can continuously input samples into the flexible tube, enabling the sample to flow through the flexible tube at a specific flow rate. As the sample passes through the magnetic component assembly, the magnetic beads within the sample are attracted and retained in the flexible tube, while the sample, after the magnetic beads are separated, is output from the flexible tube and collected. Through this process, the magnetic substance separation device can effectively utilize the automated processing device to implement automated magnetic substance separation, thereby enhancing the efficiency of magnetic substance separation for the sample. Additionally, the automated processing device can control the flow rate of the sample in the flexible tube, in conjunction with the flow path length of the flexible tube, to meet the required magnetic bead residual standards.

In configurations where the number of magnetic component assemblies and the number of accommodation compartments are both multiple, the accommodation compartments may be configured in a dual-layer arrangement, such that the magnetic component assemblies respectively housed in the two layers of accommodation compartments can form two strong magnetic surfaces on the casing, with the two strong magnetic surfaces located on opposite surfaces of the casing. However, the present disclosure is not limited to the aforementioned number. For example, in other configurations, the accommodation compartments can be arranged in three or more rows, with these rows of accommodation compartments disposed adjacent to different surfaces of the casing. Consequently, the magnetic component assemblies housed in the accommodation compartments can form three or more strong magnetic surfaces on the casing.

In one configuration, the casing may be plate-shaped, the sample container may be, for example, a flexible tube. Additionally, the casing is configured for the sample container (e.g., flexible tube) to be wound around, allowing the sample container (e.g., flexible tube) to be at least partially located on the strong magnetic surface.

In one configuration, the casing may be cylindrical and has an outer peripheral surface, and the accommodation compartment may be arranged near the outer peripheral surface, such that the strong magnetic surface can be located on the outer peripheral surface of the casing. In this configuration, the sample container may be, for example, a flexible tube, and the casing is configured to allow the sample container (e.g., flexible tube) to be wound around, with the sample container (e.g., flexible tube) wound on the outer peripheral surface (i.e., strong magnetic surface). Additionally, in configurations where the casing is cylindrical and has an outer peripheral surface, the magnetic substance separation device may further include a holder disposed on the casing to secure the sample container onto the strong magnetic surface of the casing. The holder may be a quick-release outer cover and include a support base and at least one extension arm. The support base is detachably disposed on an end surface of the casing, and the extension arm is connected to the support base and suspended above the strong magnetic surface, configured for the sample container (e.g., flexible tube) to be wound around.

In one configuration, the casing may be cylindrical and has an inner peripheral surface, and the accommodation compartment may be arranged near the inner peripheral surface, such that the strong magnetic surface can be located on the inner peripheral surface of the casing. Additionally, in configurations where the casing is cylindrical and has an inner peripheral surface, the magnetic substance separation device may further include a holder. The inner peripheral surface of the casing may surround and form an accommodation space, and the holder is configured to secure the sample container onto the strong magnetic surface of the casing. For example, the sample container may be, for example, a flexible tube, and the holder may be a quick-release shaft detachably disposed in the accommodation space, configured for the sample container (e.g., flexible tube) to be wound around.

First Embodiment

Figure 2:
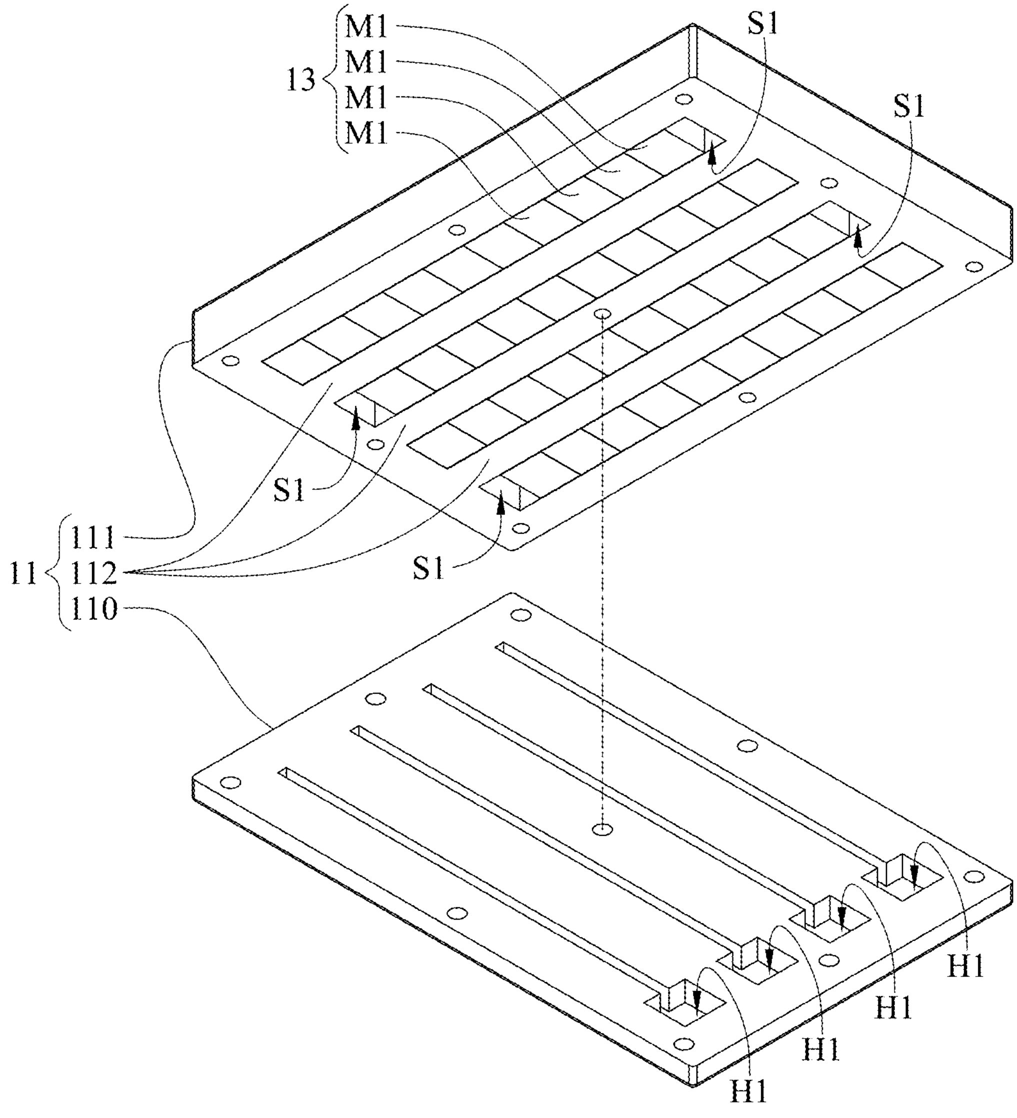
FIG. 2 is an exploded view of the magnetic substance separation device as shown in FIG. 1.

Referring to FIG. 1 and FIG. 2, FIG. 1 is a perspective view of a magnetic substance separation device in accordance with the first embodiment of the disclosure, and FIG. 2 is an exploded view of the magnetic substance separation device as shown in FIG. 1.

In this embodiment, the magnetic substance separation device 1 is configured to attract magnetic substances in a sample within a sample container (not shown). The magnetic substance separation device 1 includes a casing 11 and a plurality of magnetic component assemblies 13.

In this embodiment, the casing 11 has four accommodation compartments S1, and the four accommodation compartments S1 are parallel to each other. Specifically, the casing 11 includes a main housing 111, three partitions 112 and a base 110. The three partitions 112 are arranged in the main housing 111 to form four parallel elongated grooves on the main housing 111. The base 110 is secured to the main housing 111, for example (but not limited to), by screws, thereby forming the four accommodation compartments S1 together with the main housing 111 and the partitions 112. Moreover, the partitions 112 are respectively disposed between two adjacent accommodation compartments S1. Additionally, the base 110 has four openings Hl respectively connected to the four accommodation compartments S1, allowing the magnetic component assemblies 13 to be inserted into the accommodation compartments S1 via the openings H1.

As shown in FIG. 1, a length direction and a width direction of the casing 11 correspond to an X-axis direction and a Y-axis direction, respectively. In this embodiment, an extension direction of the accommodation compartments S1 is substantially parallel to the X-axis direction, which can be considered as extending along the length direction of the casing 11, but the disclosure is not limited thereto. In other embodiments, the extension direction of the accommodation compartments in the casing can be substantially parallel to the Y-axis direction, meaning the accommodation compartments can extend along the width direction of the casing.

In this embodiment, the partitions 112 are integrally formed with the main housing 111, but the present disclosure is not limited to the aforementioned structural configuration. In other embodiments, the main housing, partitions, and base may be integrally formed as a single casing.

In this embodiment, the four magnetic component assemblies 13 are respectively disposed in the four accommodation compartments S1. In addition, each of the magnetic component assemblies 13 includes at least four cubic magnetic components M1. In other words, each accommodation compartments S1 houses at least four cubic magnetic components M1. During assembly, the cubic magnetic components M1 are inserted into the accommodation compartments S1 through the openings H1. Moreover, the cubic magnetic components M1 are linearly arranged with different magnetization directions, allowing magnetic field lines of the magnetic component assemblies 13 to concentrate on one side.

Figure 3:
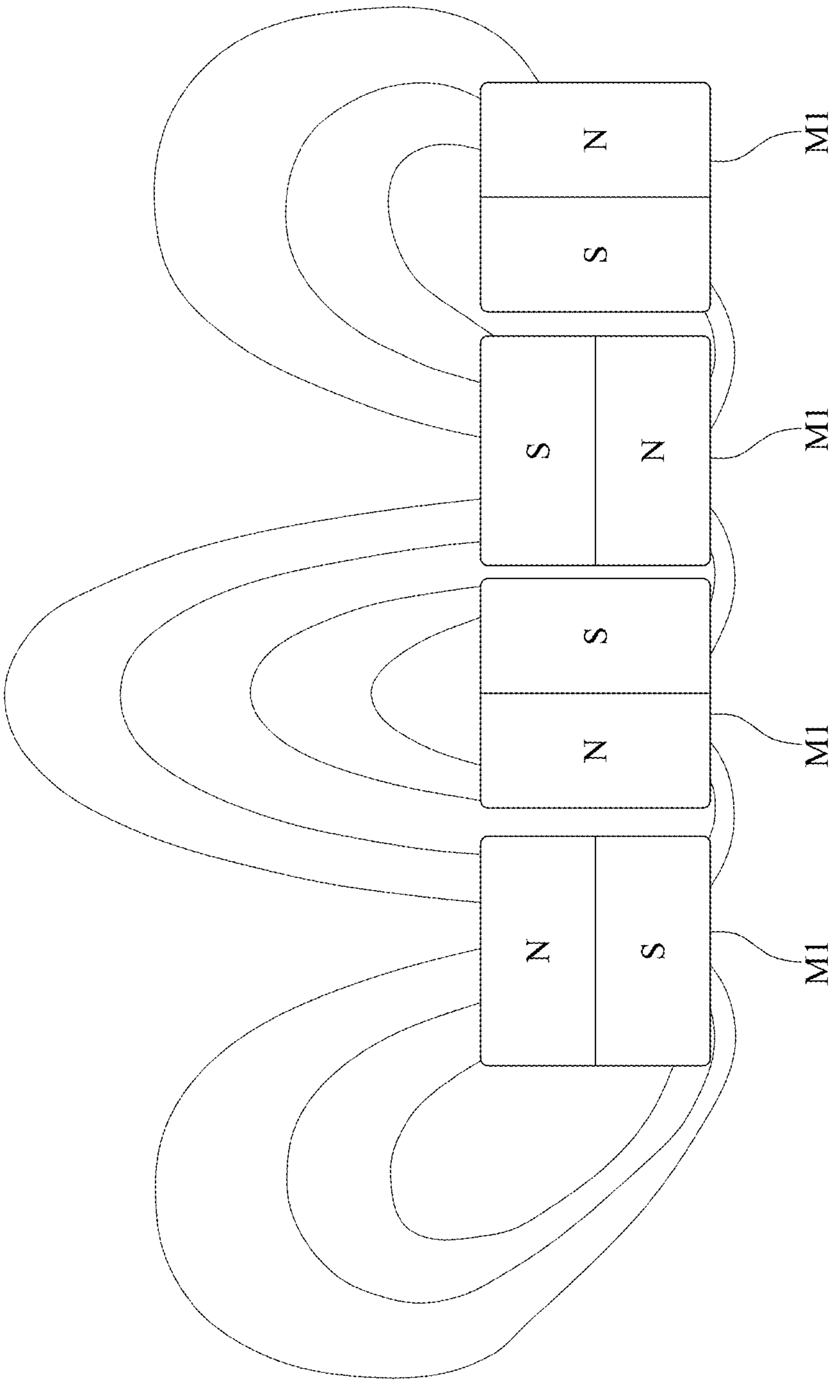
FIG. 3 illustrates a schematic diagram of the magnetic force distribution formed by four cubic magnetic components linearly arranged with different magnetization directions.
Figure 4:
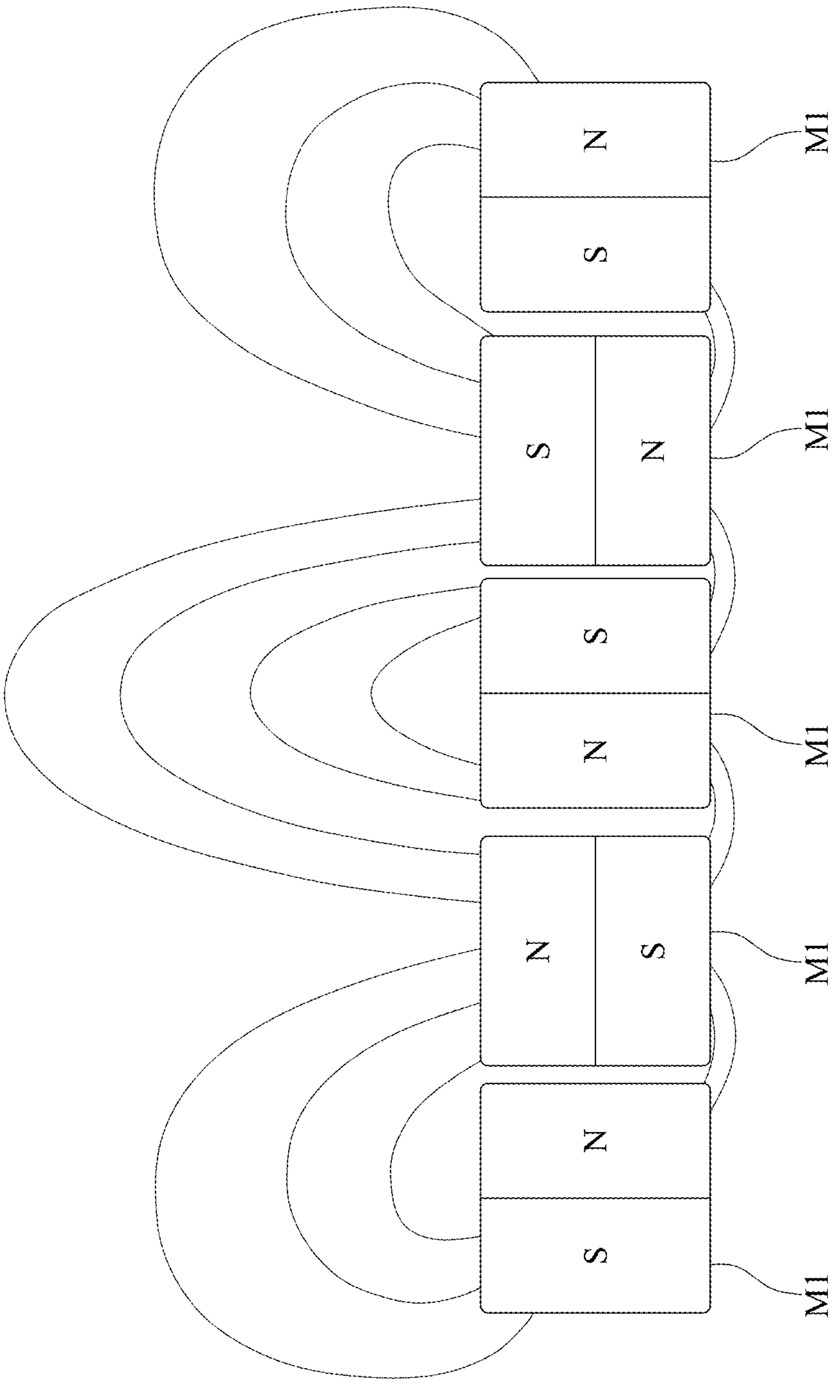
FIG. 4 illustrates a schematic diagram of the magnetic force distribution formed by five cubic magnetic components linearly arranged with different magnetization directions.

Further referring to FIG. 3 and FIG. 4, FIG. 3 illustrates a schematic diagram of the magnetic force distribution formed by four cubic magnetic components linearly arranged with different magnetization directions, and FIG. 4 illustrates a schematic diagram of the magnetic force distribution formed by five cubic magnetic components linearly arranged with different magnetization directions. As shown in FIG. 3 and FIG. 4, a strong magnetic region can be formed on one side of the cubic magnetic components M1 by arranging the cubic magnetic components M1 linearly with different magnetization directions, and a weak magnetic region can be formed on the other side of the cubic magnetic components M1, which allows a strong magnetic force to be generated in one acting direction (acting surface) using fewer magnetic components, thereby providing stronger magnetic force per unit area. The linear arrangement of cubic magnetic components with different magnetization directions involves arranging multiple cubic magnetic components with N and S poles in a specific pattern (which may be, for example, Halbach array), as shown in FIG. 3 and FIG. 4.

The number of cubic magnetic components M1 in FIG. 3 or in FIG. 4 is provided only as an example, and the present disclosure is not limited to the specific number as shown in FIG. 3 and FIG. 4. In some embodiments of the disclosure, each magnetic component assembly may include six or more cubic magnetic components. The aforementioned cubic magnetic components M1 may be, for example, magnets with N and S poles, but the disclosure is not limited thereto.

By the above arrangement of the cubic magnetic components M1, the four magnetic component assemblies 13 form a strong magnetic surface B1 and a weak magnetic surface B2 on opposite sides of the casing 11. The strong magnetic surface B1 is configured to attract magnetic substances in the sample within the sample container. In specific, the strong magnetic surface B1 is located on a surface of the main housing 111 that is furthest from the base 110, and the weak magnetic surface B2 is located on a surface of the base 110 that is furthest from the main housing 111.

In this embodiment, the cubic magnetic components M1 are all cubes. In other words, each face of the cubic magnetic components M1 is a square. It should be noted that the term "cube" may refer to a perfect cube as well as a rectangular cuboid whose shape closely approximates a perfect cube due to manufacturing tolerances.

In this embodiment, the cubic magnetic components M1 in one of the accommodation compartments S1 are arranged in an offset configuration relative to the cubic magnetic components M1 in adjacent one of the accommodation compartments S1, but the disclosure is not limited thereto. In other embodiments, the cubic magnetic components in any adjacent two of the accommodation compartments may be arranged in alignment with each other.

In this embodiment, each two adjacent cubic magnetic components M1 within the same accommodation compartments S1 are in physical contact with each other, but the disclosure is not limited thereto. In other embodiments, there may be a gap between each two adjacent cubic magnetic components. A distance between adjacent two cubic magnetic components within a single accommodation compartment may, for example, be controlled by limiting these cubic magnetic components using wall surfaces at both ends of the accommodation compartment. For instance, when the length of the accommodation compartment is substantially equal to the total length of the cubic magnetic components within the accommodation compartment, the wall surfaces at both ends of the accommodation compartment will press against the outermost cubic magnetic components, causing the cubic magnetic components within the accommodation compartment to be tightly adjacent to each other. Conversely, when the length of the accommodation compartment is greater than the total length of the cubic magnetic components within the accommodation compartment, a gap may exist between any adjacent two cubic magnetic components, for example, due to repulsive forces.

In this embodiment, the cubic magnetic components M1 are in physical contact with an inner peripheral surface of the accommodation compartments S1. By matching the shape of the cubic magnetic components M1 to the shape of the accommodation compartments S1, unexpected rotation of the cubic magnetic components M1 within the accommodation compartments S1 can be prevented, thereby ensuring the structural configuration of the cubic magnetic components M1 being linearly arranged with different magnetization directions.

In the magnetic substance separation device 1 of this embodiment, the number of the accommodation compartments S1 is four, each accommodation compartments S1 receives ten cubic magnetic components M1, a side length of each cubic magnetic component M1 is substantially 10 mm, and a thickness of each partition 112 is substantially 7.9 mm. Additionally, a thickness of the casing 11 at the strong magnetic surface B1 is substantially 2.0 mm. Under the aforementioned configuration, the strong magnetic surface B1 formed by the magnetic component assemblies 13 on the casing 11 can achieve a magnetic field strength of approximately 600 to 1000 gauss. Under the same conditions, a conventional magnet arrangement produces a magnetic field strength of only about 50 to 300 gauss on a single surface of the casing, which is significantly weaker than the magnetic field strength generated by the magnetic component assemblies 13 on the strong magnetic surface B1 in this embodiment. It can be known that in the embodiments of the disclosure, by linearly arranging the cubic magnetic components with different magnetization directions, the magnetic field lines of the magnetic component assemblies can be concentrated on one side, enabling a stronger magnetic force per unit area with fewer magnetic components.

In terms of application, magnetic bead separation tests were conducted using the magnetic substance separation device 1 of this embodiment during a cell culture process. The initial number of added cells and magnetic beads was $5\times10^6$ each. After 14 days of co-culture, magnetic bead separation was performed using the magnetic substance separation device 1 of this embodiment. The results showed that with a cell number of $1\times10^6$, the residual magnetic bead number could be reduced to less than 15, or even less than 10, which meets the recommendation that the residual magnetic bead number should be less than 30 (reference: JOURNAL OF HEMATOTHERAPY 7:437-448 (1998)).

According to the present disclosure, a size of the strong magnetic surface in the magnetic substance separation device may be designed to be greater than or equal to a surface area of the sample container, depending on actual requirements. For example, the size of the strong magnetic surface can be adjusted by modifying the number of accommodation compartments, the number of cubic magnetic components, the size of the cubic magnetic components, and/or the arrangement density of the cubic magnetic components.

Second Embodiment

Figure 5:
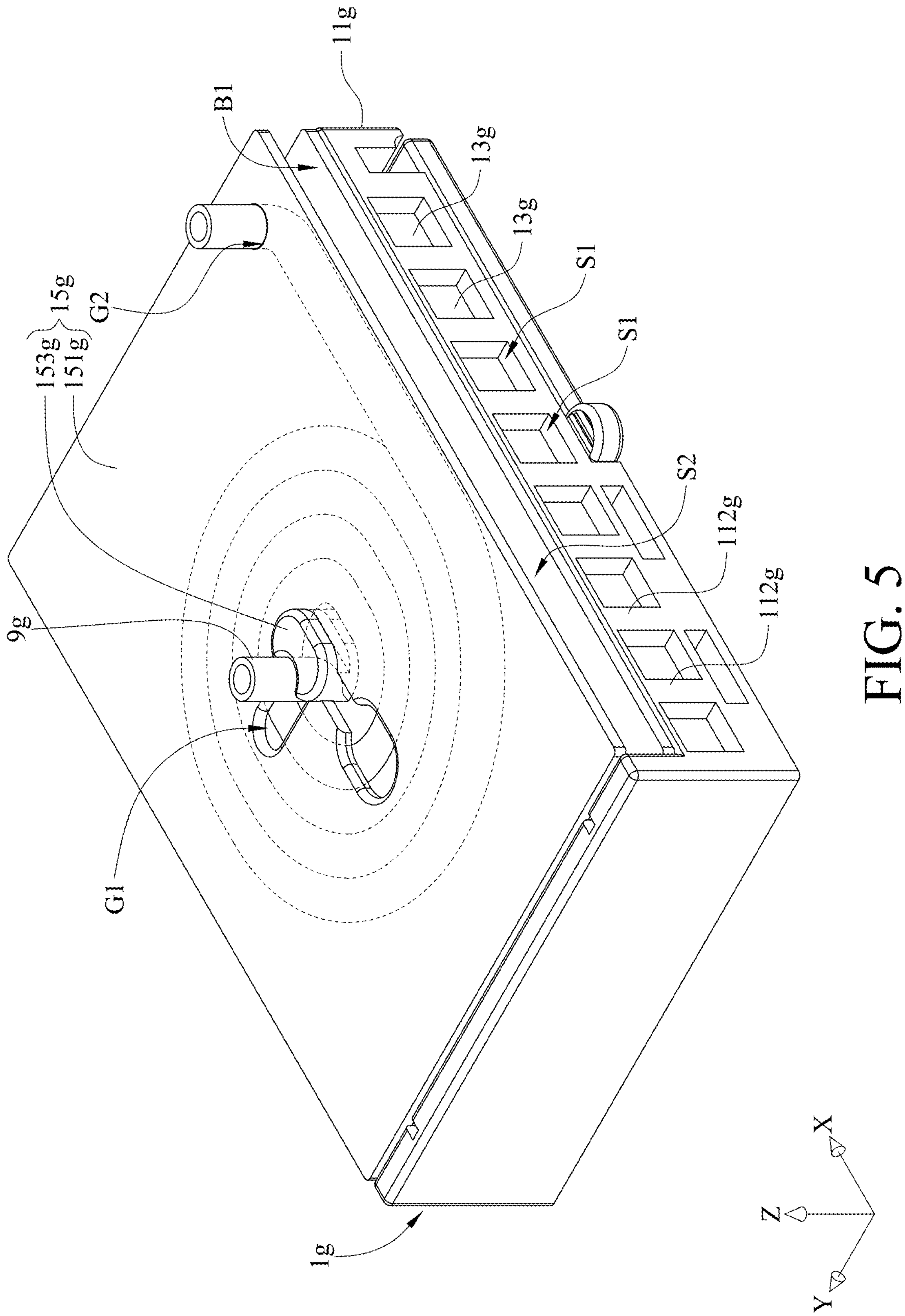
FIG. 5 is a perspective view of a magnetic substance separation device and a sample container in accordance with the second embodiment of the disclosure.

Please refer to FIG. 5, which is a perspective view of a magnetic substance separation device and a sample container in accordance with the second embodiment of the disclosure.

A magnetic substance separation device 1*g* provided in the second embodiment (corresponding to FIG. 5) is similar to the magnetic substance separation device as described in the above embodiment. The same or similar reference numerals indicate the same or similar components, and functions and effects provided by those components are the same as described above, so an explanation in this regard will not be provided again. The following describes only the primary differences between the magnetic substance separation device 1*g* of the second embodiment and the magnetic substance separation device of the above embodiment.

In the second embodiment, a sample container 9*g* is a biocompatibility-certified flexible tube connected to, for example, a cell culture apparatus (not shown), allowing the magnetic substance separation device 1*g* to remove magnetic beads used during the culturing process. The cell culture apparatus, serving as an automated processing device, can continuously input samples into the flexible tube, enabling the sample to flow through the flexible tube at a specific flow rate. As the sample passes through magnetic component assemblies 13*g*, the magnetic beads within the sample are attracted and retained in the flexible tube, while the sample, after the magnetic beads are separated, is output from the flexible tube and collected. Through this process, the magnetic substance separation device 1*g* can effectively utilize the automated processing device to implement automated magnetic substance separation, thereby enhancing the efficiency of magnetic substance separation for the sample. Additionally, the automated processing device can control the flow rate of the sample in the flexible tube, in conjunction with the flow path length of the flexible tube, to meet the required magnetic bead residual standards.

A holder 15*g* of the magnetic substance separation device 1*g* is configured to secure the sample container (e.g., flexible tube) onto a strong magnetic surface B1 of a casing 11*g*.

Specifically, the holder 15*g* includes a cover 151*g* and a central post 153*g*. The cover 151*g* is disposed on the casing 11*g* via, for example, at least one positioning pin (not shown), forming an accommodation space S2 between the cover 151*g* and the strong magnetic surface B1. The cover 151*g* has a first passage hole G1 and a second passage hole G2 that are connected to the accommodation space S2. The central post 153*g* is disposed in a central region of the strong magnetic surface B1 and disposed to pass through the cover 151*g*, and the central post 153*g* has a winding groove (not numbered) on its peripheral surface, configured for the sample container 9*g* to be wound around. Moreover, the first passage hole G1 of the cover 151*g* is configured for the sample container 9*g* to pass through and extend into the accommodation space S2, the winding groove of the central post 153*g* is located in the accommodation space S2 and configured for the sample container 9*g* to be wound around, and the second passage hole G2 of the cover 151*g* is configured for the sample container 9*g* to pass through and extend out of the accommodation space S2.

In the second embodiment, the number of magnetic component assemblies 13*g* and the number of accommodation compartments S1 are both eight. Each of the magnetic component assemblies 13*g* includes eight cubic magnetic components, a side length of each cubic magnetic component is substantially 10 mm, the number of partitions 112*g* respectively positioned between two adjacent accommodation compartments S1 is seven, and a thickness of each partition 112*g* is substantially 4.8 mm. Furthermore, a thickness of the casing 11*g* at the strong magnetic surface B1 is 2.0 mm. Under the aforementioned configuration, the strong magnetic surface B1 formed by the magnetic component assemblies 13*g* on the casing 11*g* can achieve a magnetic field strength of approximately 3500 gauss. Under the same conditions, a conventional magnet arrangement produces a magnetic field strength of only about 50 to 300 gauss on one surface of the casing, which is significantly weaker than the magnetic field strength generated by the magnetic component assemblies 13*g* on the strong magnetic surface B1 in this embodiment. It can be known that in the embodiments of the disclosure, by linearly arranging the cubic magnetic components with different magnetization directions, the magnetic field lines of the magnetic component assemblies 13*g* can be concentrated on one side, enabling a stronger magnetic force per unit area with fewer magnetic components.

In terms of application, magnetic bead separation tests were conducted using the magnetic substance separation device 1*g* of this embodiment during a cell culture process. The initial number of added cells and magnetic beads was $5\times10^6$ each. After 14 days of co-culture, magnetic bead separation was performed using the magnetic substance separation device 1*g* of this embodiment. The results showed that with a cell number of $1\times10^6$, the residual magnetic bead number could be reduced to less than 15, or even less than 10, which meets the recommendation that the residual magnetic bead number should be less than 30.

Third Embodiment

Figure 6:
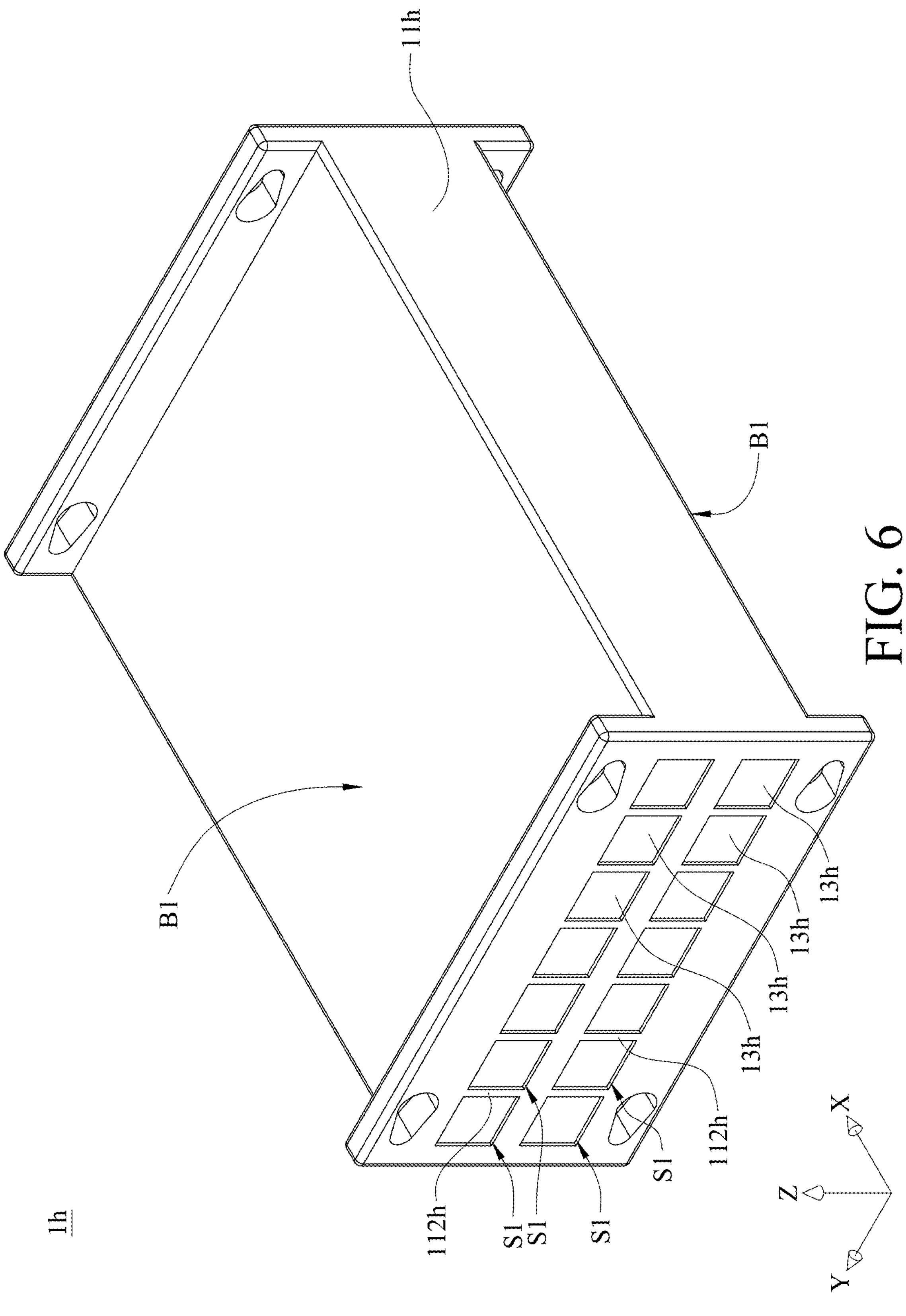
FIG. 6 is a perspective view of a magnetic substance separation device in accordance with the third embodiment of the disclosure.

Please refer to FIG. 6, which is a perspective view of a magnetic substance separation device in accordance with the third embodiment of the disclosure.

A magnetic substance separation device 1*h* in the third embodiment (corresponding to FIG. 6) is similar to the magnetic substance separation devices as described in the above embodiments. The same or similar reference numerals indicate the same or similar components, and functions and effects provided by those components are the same as described above, so an explanation in this regard will not be provided again. The following describes only the primary differences between the magnetic substance separation device 1*h* of the third embodiment and the magnetic substance separation devices of the above embodiments.

In the third embodiment, a casing 11*h* is plate-shaped, and accommodation compartments S1 are configured in a dual-layer arrangement. In addition, magnetic component assemblies 13*h* respectively housed in the two layers of accommodation compartments S1 can form two strong magnetic surfaces B1 on the casing 11*h,* with the two strong magnetic surfaces B1 located on opposite surfaces of the casing 11*h*. Therefore, the total area of the strong magnetic surfaces of the magnetic substance separation device can be increased.

In the third embodiment, the number of magnetic component assemblies 13*h* and the number of accommodation compartments S1 are both fourteen (e.g., seven per layer). Each of the magnetic component assemblies 13*h* includes twelve cubic magnetic components, and a side length of each cubic magnetic component is substantially 10 mm. In the same layer of accommodation compartments S1, a thickness of each of partitions 112*h* respectively positioned between two adjacent accommodation compartments S1 is substantially 1.5 mm. Furthermore, a thickness of the casing 11*h* at the two strong magnetic surfaces B1 is also substantially 1.5 mm. Under the aforementioned configuration, the two strong magnetic surfaces B1 formed by the magnetic component assemblies 13*h* on the casing 11*h* each can achieve a magnetic field strength of approximately 4300 gauss. Under the same conditions, a conventional magnet arrangement produces a magnetic field strength of only about 50 to 300 gauss on a surface of the casing, which is significantly weaker than the magnetic field strength generated by the magnetic component assemblies 13*h* on the strong magnetic surfaces B1 in this embodiment. It can be known that in the embodiments of the disclosure, by linearly arranging the cubic magnetic components with different magnetization directions, the magnetic field lines of one magnetic component assembly can be concentrated on one side, enabling a stronger magnetic force per unit area with fewer magnetic components.

In the third embodiment, the magnetic substance separation device 1*h* may, for example, be suitable for a flexible tube serving as a sample container (not shown). For instance, the sample container can be directly wound around the casing 11*h,* with at least part of the tube corresponding to the two strong magnetic surfaces B1.

In terms of application, magnetic bead separation tests were conducted using the magnetic substance separation device 1*h* of this embodiment during a cell culture process. The initial number of added cells and magnetic beads was $5\times10^6$ each. After 14 days of co-culture, magnetic bead separation was performed using the magnetic substance separation device 1*h* of this embodiment. The results showed that with a cell number of $1\times10^6$, the residual magnetic bead number could be reduced to less than 15, or even less than 10, which meets the recommendation that the residual magnetic bead number should be less than 30.

Moreover, the extension direction of the accommodation compartments in the casing as shown in the third embodiment differs from that as shown in the second embodiment. In the second embodiment, the accommodation compartments extend in a direction parallel to the Y-axis, while in the third embodiment, the accommodation compartments extend in a direction parallel to the X-axis. As a result, the magnetic component assemblies in these two embodiments exhibit different magnetic field distributions, but the disclosure is not limited to the extension direction of the accommodation compartments in the casing. For example, the extension direction of the accommodation compartments in the casing in the second embodiment can be adjusted, based on actual design requirements, to be parallel to the X-axis, meaning the accommodation compartments may extend along the length direction of the casing. Similarly, the extension direction of the accommodation compartments in the casing in the third embodiment can be adjusted, based on actual design requirements, to be parallel to the Y-axis, meaning the accommodation compartments may extend along the width direction of the casing.

Fourth Embodiment

Figure 7:
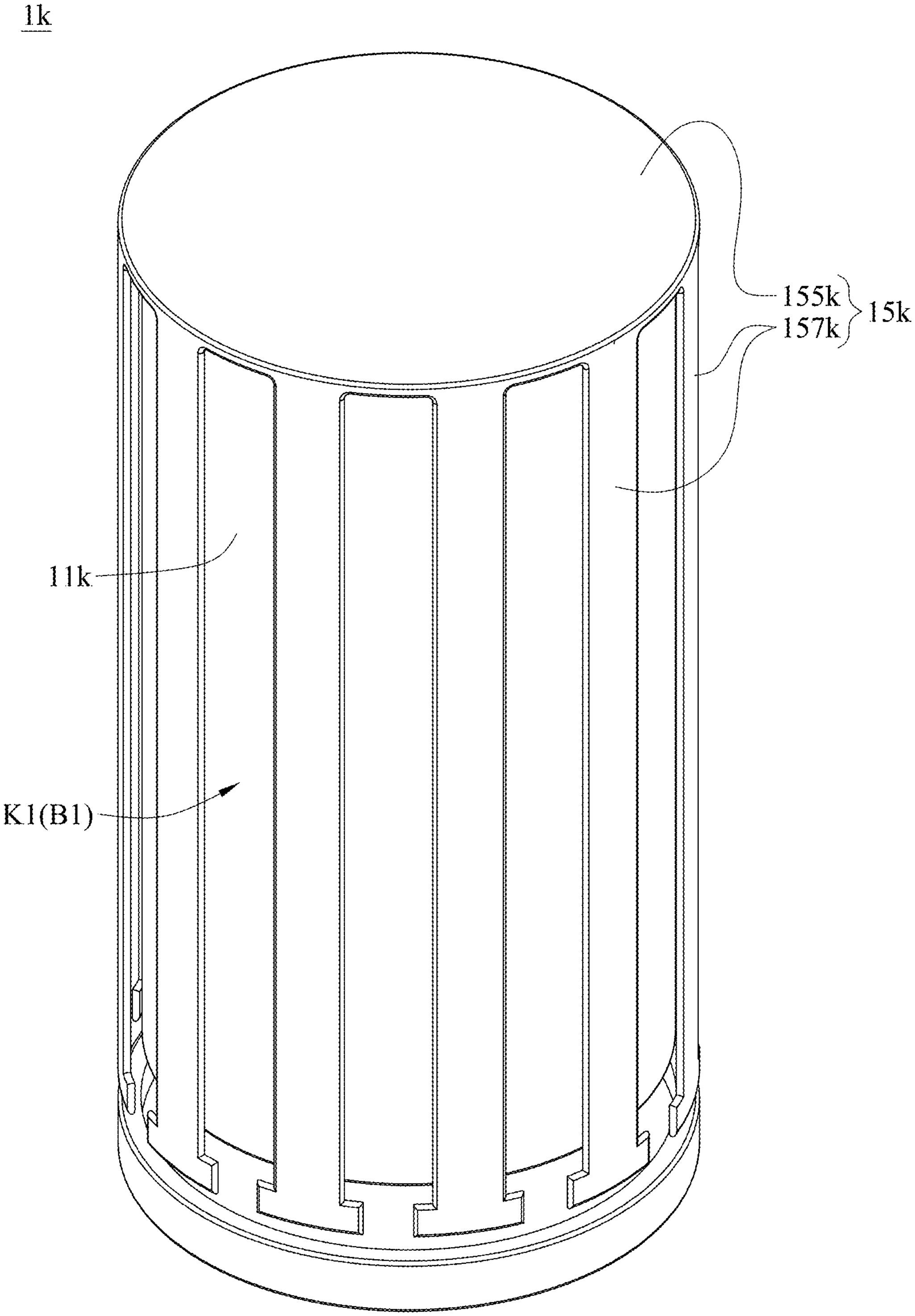
FIG. 7 is a perspective view of a magnetic substance separation device in accordance with the fourth embodiment of the disclosure.
Figure 8:
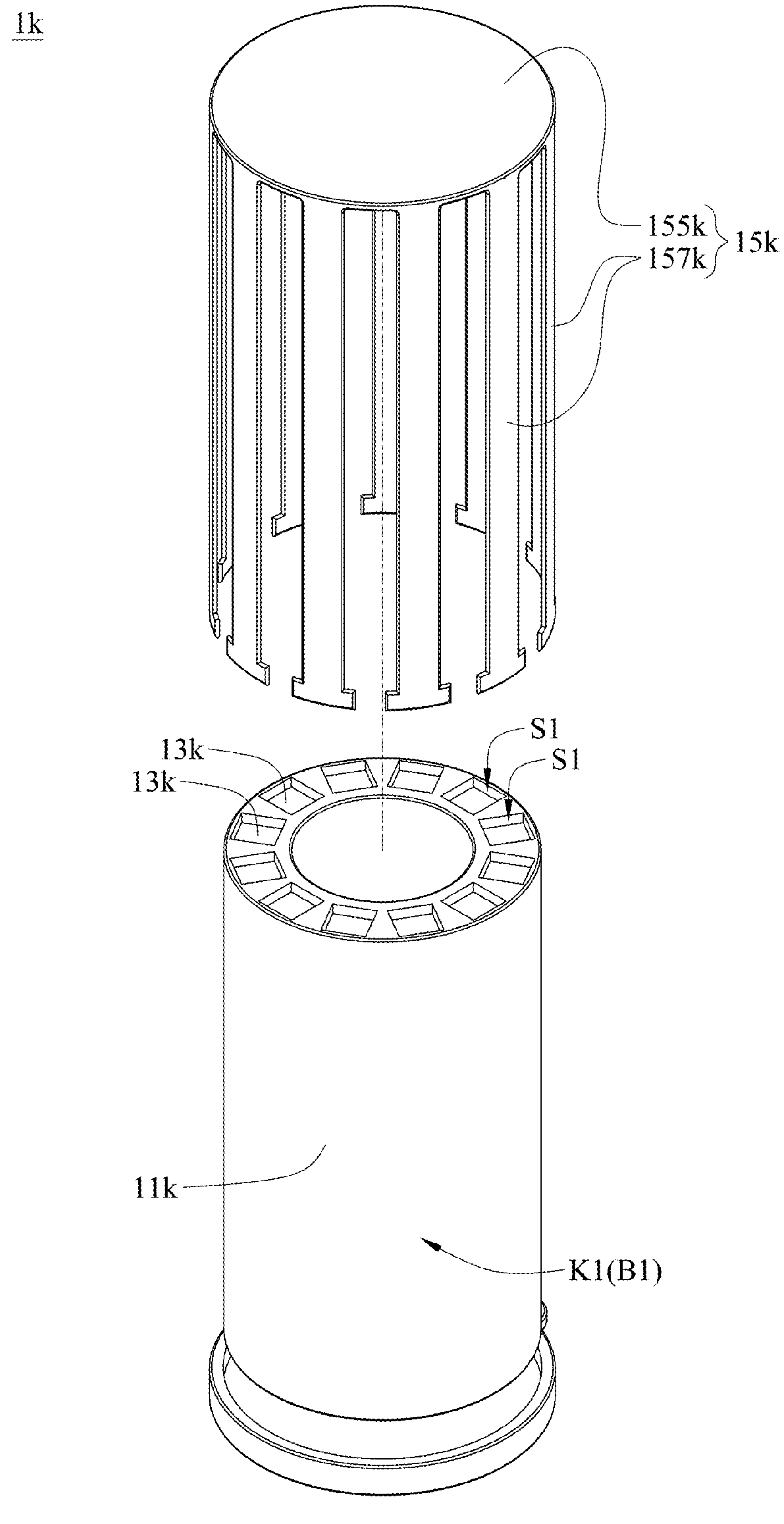
FIG. 8 is an exploded view of the magnetic substance separation device as shown in FIG. 7.

Referring to FIG. 7 and FIG. 8, FIG. 7 is a perspective view of a magnetic substance separation device in accordance with the fourth embodiment of the disclosure, and FIG. 8 is an exploded view of the magnetic substance separation device as shown in FIG. 7.

A magnetic substance separation device 1*k* provided in the fourth embodiment (corresponding to FIG. 7) is similar to the magnetic substance separation devices as described in the above embodiments. The same or similar reference numerals indicate the same or similar components, and functions and effects provided by those components are the same as described above, so an explanation in this regard will not be provided again. The following describes only the primary differences between the magnetic substance separation device 1*k* of the fourth embodiment and the magnetic substance separation devices of the above embodiments.

In the fourth embodiment, a casing 11*k* is cylindrical and has an outer peripheral surface K1. Accommodation compartments S1 are arranged near the outer peripheral surface K1, and a strong magnetic surface B1 is located on the outer peripheral surface K1 of the casing 11*k*. That is, magnetic component assemblies 13*k* housed in the accommodation compartments S1 form the strong magnetic surface B1 on the outer peripheral surface K1 of the casing 11*k*.

In the fourth embodiment, the magnetic substance separation device 1*k* may, for example, be suitable for a flexible tube serving as a sample container (not shown). Specifically, a holder 15*k* is a quick-release outer cover and includes a support base 155*k* and a plurality of extension arms 157*k*.

The support base 155$k$ is detachably disposed on an end surface of the casing 11$k$, and the extension arms 157$k$ are connected to the support base 155$k$ and suspended above the strong magnetic surface B1. Moreover, the extension arms 157$k$ are configured for the sample container (e.g., flexible tube) to be wound around, securing the sample container onto strong magnetic surface B1, but the disclosure is not limited thereto. In other configurations, the magnetic substance separation device 1$k$ may not include a holder (e.g., quick-release outer cover) 15$k$, and the sample container may be directly wound around the casing 11$k$ to be located on the strong magnetic surface B1. Under the aforementioned configuration, the strong magnetic surface B1 formed by the magnetic component assemblies 13$k$ on the casing 11$k$ can achieve a magnetic field strength of approximately 4300 gauss.

In terms of application, magnetic bead separation tests were conducted using the magnetic substance separation device 1$k$ of this embodiment during a cell culture process. The initial number of added cells and magnetic beads was $5\times10^6$ each. After 14 days of co-culture, magnetic bead separation was performed using the magnetic substance separation device 1$k$ of this embodiment. The results showed that with a cell number of $1\times10^6$, the residual magnetic bead number could be reduced to less than 15, or even less than 10, which meets the recommendation that the residual magnetic bead number should be less than 30.

Fifth Embodiment

Figure 9:
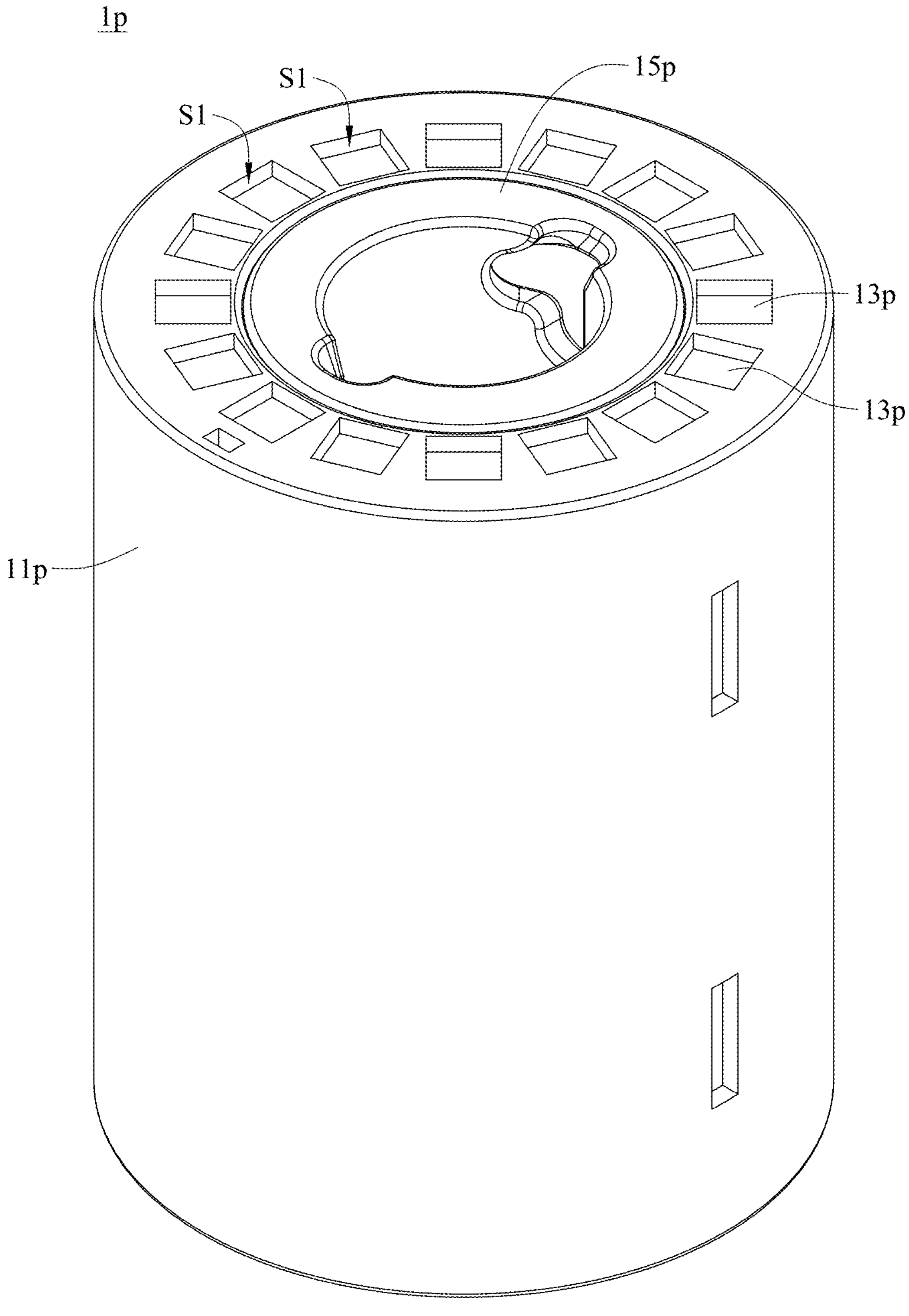
FIG. 9 is a perspective view of a magnetic substance separation device in accordance with the fifth embodiment of the disclosure.
Figure 10:
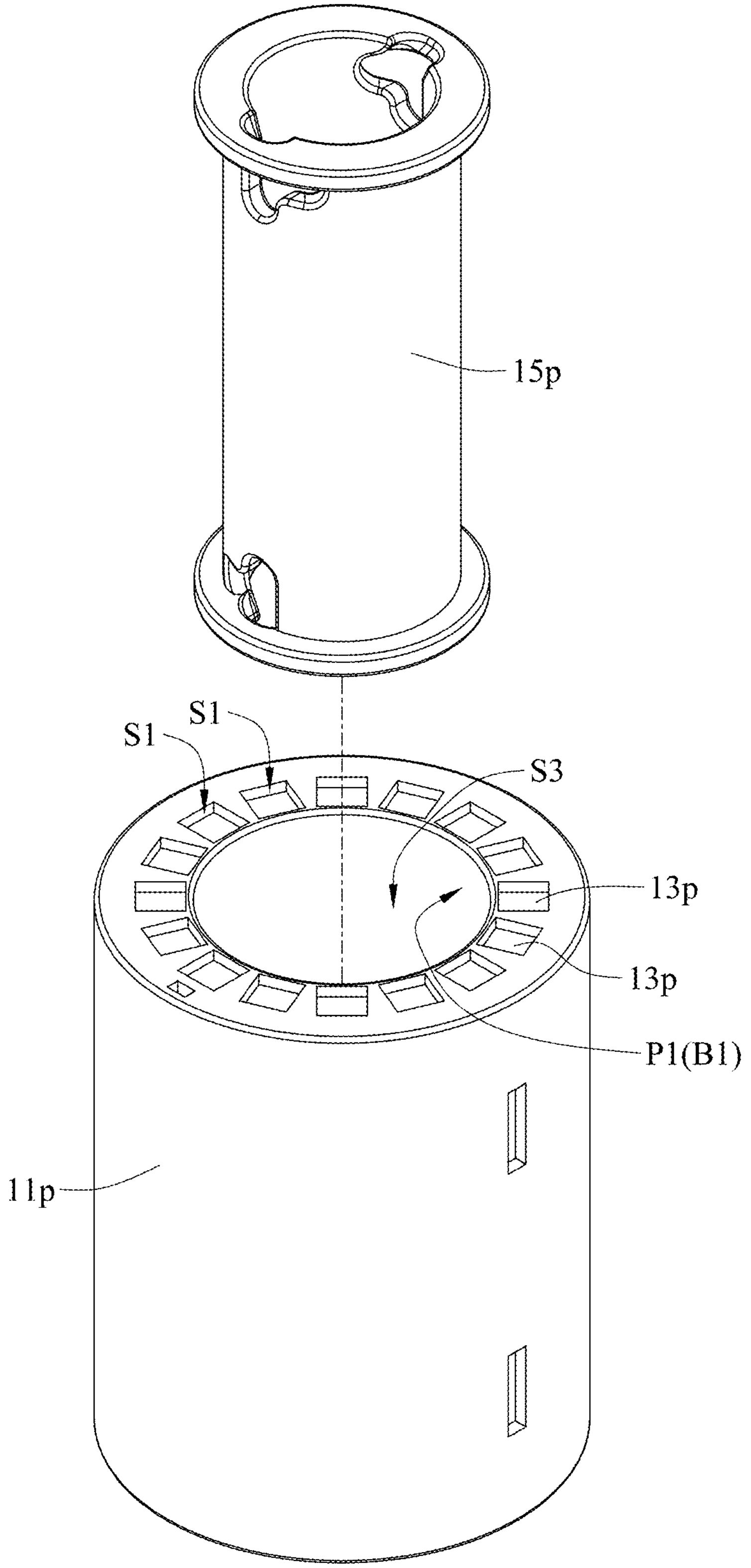
FIG. 10 is an exploded view of the magnetic substance separation device as shown in FIG. 9.

Referring to FIG. 9 and FIG. 10, FIG. 9 is a perspective view of a magnetic substance separation device in accordance with the fifth embodiment of the disclosure, and FIG. 10 is an exploded view of the magnetic substance separation device as shown in FIG. 9.

A magnetic substance separation device 1$p$ provided in the fifth embodiment (corresponding to FIG. 9) is similar to the magnetic substance separation devices as described in the above embodiments. The same or similar reference numerals indicate the same or similar components, and functions and effects provided by those components are the same as described above, so an explanation in this regard will not be provided again. The following describes only the primary differences between the magnetic substance separation device 1$p$ of the fifth embodiment and the magnetic substance separation devices of the above embodiments.

In the fifth embodiment, a casing 11$p$ is cylindrical and has an inner peripheral surface P1. Accommodation compartments S1 are arranged near the inner peripheral surface P1, and a strong magnetic surface B1 is located on the inner peripheral surface P1 of the casing 11$p$. That is, magnetic component assemblies 13$p$ housed in the accommodation compartments S1 form the strong magnetic surface B1 on the inner peripheral surface P1 of the casing 11$p$.

In the fifth embodiment, the magnetic substance separation device 1$p$ may, for example, be suitable for a flexible tube serving as a sample container (not shown). Specifically, a holder 15$p$ is a quick-release shaft detachably disposed in an accommodation space S3 that is surrounded and formed by the inner peripheral surface P1. Moreover, the holder 15$p$ is configured for the sample container (e.g., flexible tube) to be wound around, such that at least part of the sample container, together with the holder 15$p$, can be placed into the accommodation space S3 and secured onto the strong magnetic surface B1. Under the aforementioned configuration, the strong magnetic surface B1 formed by the magnetic component assemblies 13$p$ on the inner peripheral surface Pl of the casing 11$p$ can achieve a magnetic field strength of approximately 4300 gauss.

In terms of application, magnetic bead separation tests were conducted using the magnetic substance separation device 1$p$ of this embodiment during a cell culture process. The initial number of added cells and magnetic beads was $5\times10^6$ each. After 14 days of co-culture, magnetic bead separation was performed using the magnetic substance separation device 1$p$ of this embodiment. The results showed that with a cell number of $1\times10^6$, the residual magnetic bead number could be reduced to less than 15, or even less than 10, which meets the recommendation that the residual magnetic bead number should be less than 30.

As seen from the first to the fifth embodiments described above, the magnetic substance separation devices of the present disclosure can be configured in various ways, allowing the magnetic substance separation device to adapt to different scenarios and sample requirements. Additionally, the magnetic substance separation devices are also suitable for use in automated sampling machines, enabling batch automated processing. Furthermore, experiments conducted using suitable sample containers demonstrate that, with a cell number of $1\times10^6$, the magnetic substance separation devices are capable of meeting the recommended residual magnetic bead number of less than 30. Additionally, in these experiments, the cell loss rate was controlled at approximately 10%, and the cell viability was maintained above 94.1%.

According to the magnetic substance separation device as disclosed in the above embodiments, by arranging the cubic magnetic components in a specific manner, a strong magnetic surface can be formed on the casing, enabling stronger magnetic force per unit area with fewer magnetic components. Furthermore, the magnetic substance separation device can be adjusted to adapt to different container shapes, thereby enhancing the efficiency of magnetic interactions while meeting requirements for efficiency, convenience, automation, biosafety and biocompatibility.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A magnetic substance separation device configured for attracting magnetic substances in a sample within a sample container, and the magnetic substance separation device comprising:

a casing having at least one accommodation compartment; and at least one magnetic component assembly disposed in the at least one accommodation compartment, and the at least one magnetic component assembly comprising at least four cubic magnetic components;

wherein the at least four cubic magnetic components are linearly arranged with different magnetization directions, allowing magnetic field lines of the at least one magnetic component assembly to concentrate on one side, such that the at least one magnetic component assembly forms at least one strong magnetic surface on the casing, and the at least one strong magnetic surface is configured to attract the magnetic substances in the sample within the sample container;

wherein the at least one magnetic component assembly comprises a plurality of magnetic component assemblies, the at least one accommodation compartment comprises a plurality of accommodation compartments, and the plurality of magnetic component assemblies are respectively disposed in the plurality of accommodation compartments; and wherein the casing has a plurality of partitions, the plurality of partitions are respectively disposed between two adjacent accommodation compartments, a thickness of each of the plurality of partitions is greater than 1.0 mm and less than or equal to 10.0 mm, and a thickness of the casing at the at least one strong magnetic surface is greater than 1.0 mm and less than or equal to 10.0 mm.

2. The magnetic substance separation device according to claim 1, wherein the at least four cubic magnetic components are arranged in Halbach array.

3. The magnetic substance separation device according to claim 1, wherein the at least one magnetic component assembly further forms a weak magnetic surface on the casing, and the weak magnetic surface and the at least one strong magnetic surface are located on opposite sides of the casing.

4. The magnetic substance separation device according to claim 1, wherein the at least four cubic magnetic components in one of the plurality of accommodation compartments are arranged in alignment or in an offset configuration relative to the at least four cubic magnetic components in another of the plurality of accommodation compartments.

5. The magnetic substance separation device according to claim 1, wherein each two adjacent cubic magnetic components within the same accommodation compartment are in physical contact with each other.

6. The magnetic substance separation device according to claim 1, wherein the at least one magnetic component assembly is in physical contact with an inner peripheral surface of the at least one accommodation compartment.

7. The magnetic substance separation device according to claim 1, wherein a side length of each cubic magnetic component ranges from 1 mm to 15 mm.

8. The magnetic substance separation device according to claim 1, further comprising a holder disposed on the casing, wherein the holder is configured to secure the sample container onto the at least one strong magnetic surface of the casing.

9. The magnetic substance separation device according to claim 8, wherein the holder includes a central post disposed in a central region of the at least one strong magnetic surface, the sample container is a flexible tube, and the central post is configured for the sample container to be wound around.

10. The magnetic substance separation device according to claim 9, wherein the holder further comprises a cover disposed on the casing, forming an accommodation space between the cover and the at least one strong magnetic surface, the cover has a first passage hole and a second passage hole that are connected to the accommodation space, the central post is disposed to pass through the cover, the central post has a winding groove, the first passage hole is configured for the sample container to pass through and extend into the accommodation space, the winding groove is located in the accommodation space and configured for the sample container to be wound around, and the second passage hole is configured for the sample container to pass through and extend out of the accommodation space.

11. The magnetic substance separation device according to claim 1, wherein the plurality of accommodation compartments are configured in a dual-layer arrangement, the at least one strong magnetic surface comprises two strong magnetic surfaces, and the two strong magnetic surfaces are located on opposite surfaces of the casing.

12. The magnetic substance separation device according to claim 11, wherein the casing is plate-shaped, the sample container is a flexible tube, and the casing is configured for the sample container to be wound around.

13. The magnetic substance separation device according to claim 1, wherein the casing is cylindrical, the casing has an outer peripheral surface, the at least one accommodation compartment is arranged near the outer peripheral surface, and the at least one strong magnetic surface is located on the outer peripheral surface of the casing.

14. The magnetic substance separation device according to claim 13, wherein the sample container is a flexible tube, and the casing is configured for the sample container to be wound around.

15. The magnetic substance separation device according to claim 13, further comprising a holder, wherein the holder is disposed on the casing, and the holder is configured to secure the sample container onto the at least one strong magnetic surface of the casing; and wherein the holder is a quick-release outer cover, the holder comprises a support base and at least one extension arm, the support base is detachably disposed on an end surface of the casing, the at least one extension arm is connected to the support base and suspended above the at least one strong magnetic surface, the sample container is a flexible tube, and the at least one extension arm is configured for the sample container to be wound around.

16. The magnetic substance separation device according to claim 1, wherein the casing is cylindrical, the casing has an inner peripheral surface, the at least one accommodation compartment is arranged near the inner peripheral surface, and the at least one strong magnetic surface is located on the inner peripheral surface of the casing.

17. The magnetic substance separation device according to claim 16, further comprising a holder, wherein the inner peripheral surface of the casing surrounds and forms an accommodation space, and the holder is configured to secure the sample container onto the at least one strong magnetic surface of the casing; and wherein the holder is a quick-release shaft, the holder is detachably disposed in the accommodation space, the sample container is a flexible tube, and the holder is configured for the sample container to be wound around.

* * * * *